Sept. 27, 1932.  H. ISON  1,879,275
MOTOR VEHICLE
Filed Aug. 16, 1930  4 Sheets-Sheet 1

INVENTOR
Harry Ison
BY
ATTORNEY

Sept. 27, 1932.  H. ISON  1,879,275
MOTOR VEHICLE
Filed Aug. 16, 1930  4 Sheets-Sheet 2

INVENTOR
Harry Ison
BY
ATTORNEY

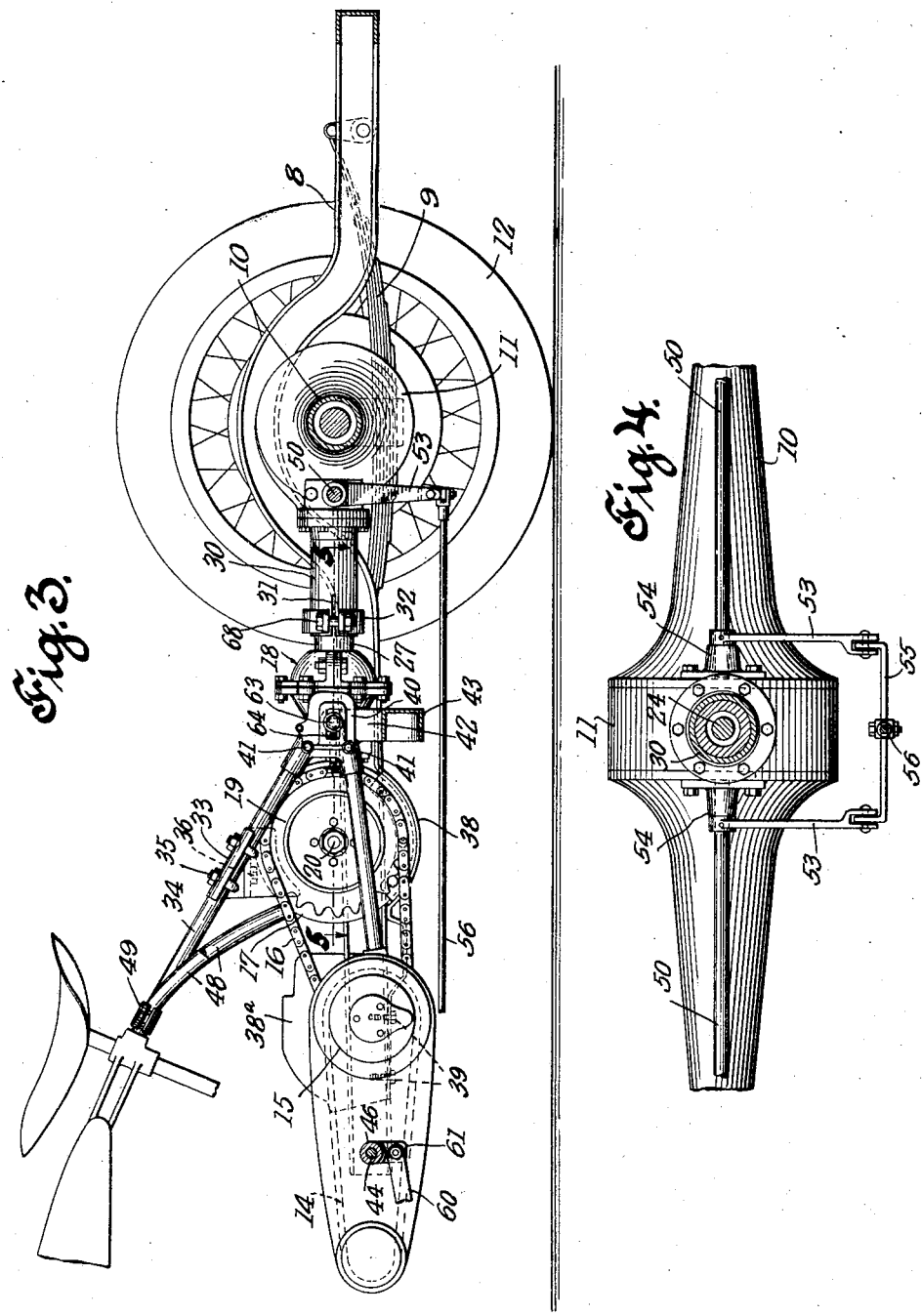

Sept. 27, 1932.    H. ISON    1,879,275
MOTOR VEHICLE
Filed Aug. 16, 1930    4 Sheets-Sheet 4
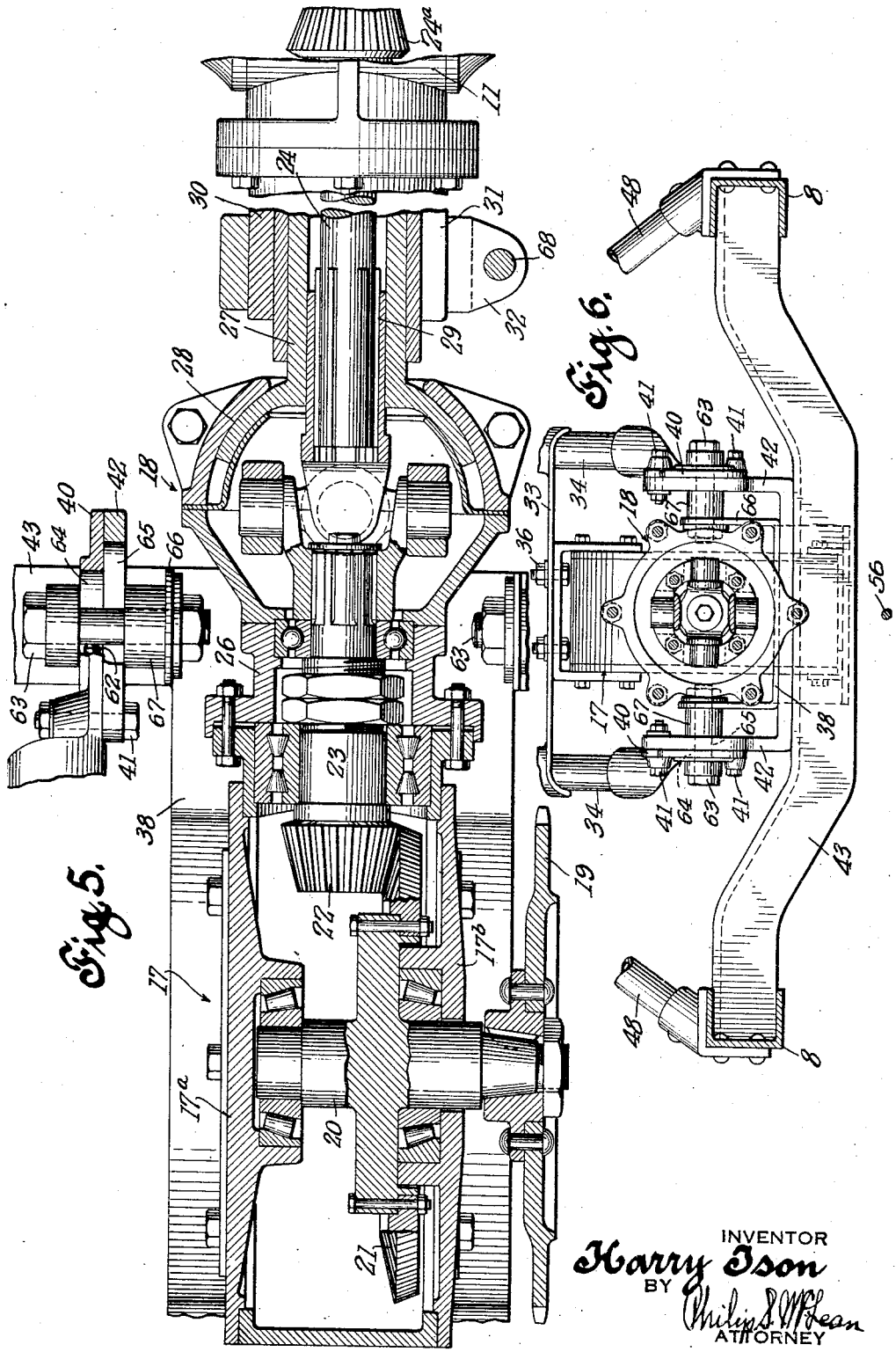
INVENTOR
Harry Ison
BY
ATTORNEY Patented Sept. 27, 1932

1,879,275

UNITED STATES PATENT OFFICE

HARRY ISON, OF NEW YORK, N. Y.

MOTOR VEHICLE

Application filed August 16, 1930. Serial No. 475,659.

The objects of this invention are to provide a light weight, economical, efficient, small car, which can be readily handled in crowded city streets, particularly adapted for parcel delivery purpose and which can be produced at reasonable cost from standard automotive units.

Further objects of the invention and the novel features of construction, combinations and relations of parts by which such objects are attained are set forth in the following specification.

The drawings accompanying and forming a part of the specification illustrate one practical commercial embodiment of the invention, but it should be understood that the structure may be modified as regards this particular disclosure without departure from the true spirit and broad scope of the invention.

Figure 1:
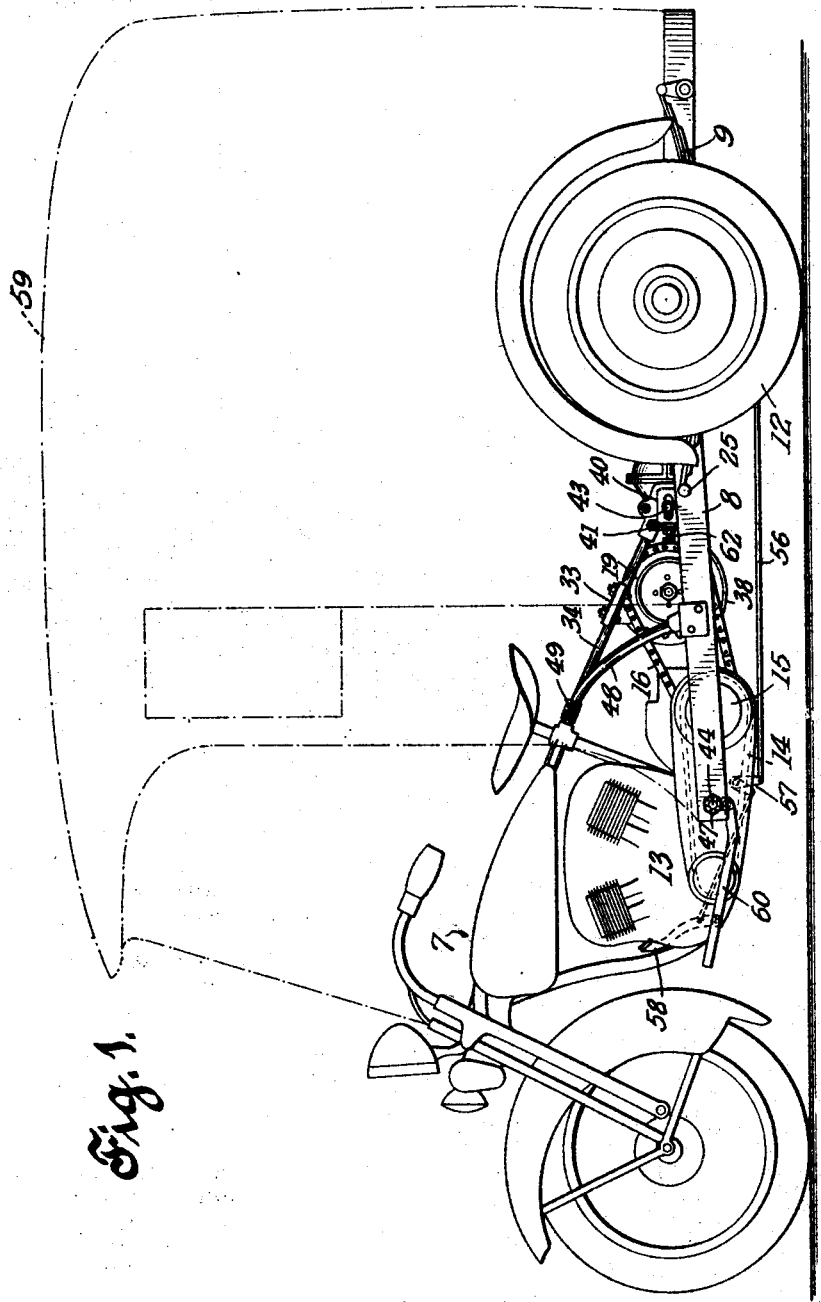
Figure 2:
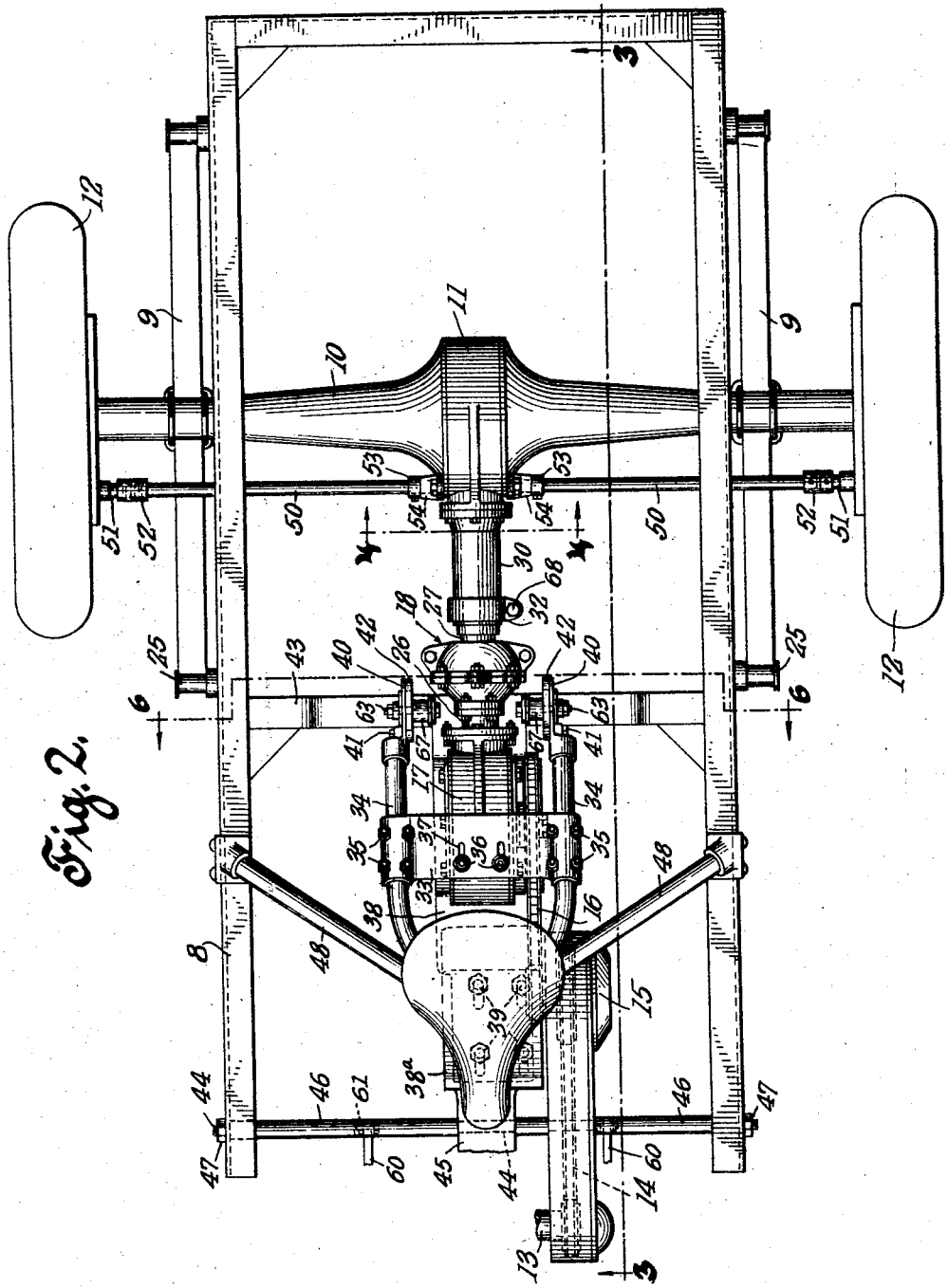

Fig. 1 is a side elevation illustrating the invention embodied in the form of a light parcel delivery car and indicating in particular how the fore part of a motorcycle is utilized as the power plant of the vehicle, combined with a standard rear axle and differential unit; Fig. 2 is a top plan view of the rearward portion of the vehicle illustrating particularly the attachment and mounting of the rear motorcycle forks on the rear frame and the drive gearing to the rear axle; Fig. 3 is a broken and part sectional side elevation of the parts appearing in Fig. 2; Fig. 4 is an enlarged broken sectional detail of the gearing taken substantially on the plane of line 4—4 of Fig. 2; Fig. 5 is a broken cross-sectional detail as on the plane of line 5—5 of Fig. 3; Fig. 6 is a similar view as on line 6—6 of Fig. 2.

In the illustrated embodiment of the invention, a motor cycle, complete except for the rear wheel is used, the same being indicated at 7 as of a typical commercial design. The removal of the rear wheel leaves the rear forks of the machine free to be coupled with a frame indicated generally at 8 and connected by springs 9 with a standard rear axle unit 10 containing a differential at 11 and mounted on rear wheels 12.

The power plant of the motorcycle at 13 has a chain drive 14 for the gearset of the machine at 15 and the drive for the rear axle is taken off from this gearset by a chain 16 substituted in place of the chain previously used to drive the rear sprocket of the motorcycle. Thus all the main parts, except the rear wheel of the motor cycle are utilized. In the space formerly occupied by the rear wheel, the gear box indicated at 17 is mounted and the final drive is through shafting extending from this gear box and having incorporated therein a universal at 18.

The details of the gearing described are illustrated in Fig. 5, wherein is shown a sprocket 19 on a cross shaft 20 journalled in the gear box 17 and carrying a bevel gear 21 in mesh with a bevel pinion 22 on the forward end of shaft 23, which is coupled through the universal with a shaft 24, the latter carrying the differential pinion 24a in mesh with the ring gear of the differential. This shaft 24 may be a shortened length of the propeller shaft which comes with the rear axle assembly.

As shown in Fig. 2, the universal joint is located substantially in line with the pivoted front ends 25 of the rear axle springs and as appears in this view and in Fig. 5, the front section of the shafting is journalled in a casing 26 rigidly connected with or forming an extension of the gear box 17, while the rearward section of the shafting is journalled in a casing 27 rigidly connected with or forming an extension of the differential housing, said two shaft casings having a universal connection at 28. The body of the gear box 17 may be a duplicate of the differential housing, as indicated in Fig. 2 except for the fact that it is closed at opposite sides by special end plates 17a and 17b carrying the bearings for the bevel gear shaft 20. The bevel gear 21 and pinion 22 may be duplicates of the ring gear and pinion of the differential. The use of these standard readily available parts is desirable from the standpoints of cost and repairs. The rear shaft section 24 is shown as having a splined connection at 29 with the rear member of the universal joint to allow for variations in distance between centers. For adjustment purposes, the rear shaft casing 27 it shown as having a telescopic mounting in the sleeve projection 30 of the differential housing, the latter being split at its forward end at 31 and secured in the adjusted relation over the shaft casing by the split clamp 32.

The gear box 17 is shown as rigidly attached to the motorcycle frame by a bridge piece 33 shown held to the rear frame bars 34 of the motorcycle by U-clamps 35 and for and aft adjustment of this gear unit relative to the gearset of the machine is provided for in the illustration by having the bolts 36 which suspend the gear box from the bridge piece operate through longitudinally disposed slots 37 in the bridge. At the bottom, the gear box is shown supported by a saddle or cradle 38 adjustably bolted to the underside of the gear box 38a of the motorcycle structure at 39, Figure 2.

The attachment of the front power unit to the rear axle assembly is effected in the illustration by securing the rear axle forks 40 of the motorcycle frame by bolts 41 to the upstanding lugs 42 on the cross bar 43 of the rear frame and by fastening the front end of this frame by a long stay bolt 44 to the lower portion of the motorcycle structure. This long bolt is indicated in Fig. 2 as extending through a through bolt passage provided in the lower portion of the motor structure 45 and as having spacer sleeves 46 thereon abutting the opposite sides of the motor and against the inner faces of the side rails of the frame, so that when the nuts 47 are applied to the outer ends of the long bolt, the front end of the frame will be rigidly secured to the motor structure.

To brace the two frames transversely, one or more stanchions 48 may be employed, extending up from the sides of the frame on forwardly and inwardly inclined slants and secured at their upper ends to the motorcycle frame as by means of the split clamp construction illustrated at 49 in Figs. 1 and 3.

The brakes of the rear wheel assembly are utilized in the illustration by coupling brake shaft extensions 50 to the brake shafts 51, which form part of the rear axle assembly as by means of the riveted couplings or collars 52 and by mounting the brake rocker arms 53 removed from said brake shafts on these shaft extensions 50 at opposite sides of the differential housing, where the inner ends of said shaft extensions are shown journalled in special brackets 54 bolted on to the sides of the housing. These brake operating arms 53 are shown in Figs. 3 and 4 as pivotally connected at their lower ends by an equalizer bar 55 to which is attached a brake rod 56 connected by linkage 57, Fig. 1, with the brake pedal 58 of the motorcycle.

The rear frame provides a base for the body, which latter as indicated at 59 in Fig. 1, may be a more or less conventional type of delivery car body, extending forwardly over the motorcycle portion of the machine sufficiently to properly protect the driver.

The long through bolt 44 which attaches the forward end of the rear frame to the underbody of the motorcycle may be inserted as a replacement for the through bolt, which supports the rearward ends of the foot rests 60, Figs. 1 and 3, and when this is done, these foot rest members may be then supported at their rearward ends by special lugs or hangers 61 carried by the spacer sleeves 46, Fig. 2. This construction serves to further brace and connect the two main frame portions of the machine.

The bolts 41, Figs. 2 and 3, rigidly secure the rear forks of the motorcycle frame to the rear axle frame. This leaves the chain adjusting mechanism of the motorcycle frame free to be utilized for adjusting the chain drive 16. Such mechanism is shown as bolts 62 mounted on the forks in position to operate against the bolts 63 positioned in the slots 64 of the forks and extending through corresponding slots 65 in the attaching lugs 42, Fig. 6 to the lugs 66 extended up from the base plate 38 of the gear box, spacer sleeves 67 being interposed on said bolts between the stationary and relatively adjustable lugs 42, 66. Referring particularly to Fig. 3, it will be seen that rearward adjustment of the gear box may be effected to take up slack of the drive chain 16 by loosening the bolts 39 attaching the lower end of the base plate 38 to the bottom of the gear box, the hanger bolts 36 attaching the gear box to the bridge member 33, the fork bolts 63 and the bolt 68 of the split clamp 32, whereupon on turning the take-up bolts 62, the entire drive train, starting with the gear box 17 can be forced rearwardly to tighten the chain on the sprocket carried by said gear box. In this action, the rearward half of the universal housing will be forced back, causing the rearward shaft housing 27 to telescope into the differential shaft housing 30. With the parts properly adjusted, the split clamp 32 is set up to hold the telescoped shaft housing sections in their new adjusted relations and the fork bolts 63, hanger bolts 36 and base securing bolts 39 are again tightened.

The invention it will be seen, makes it possible to construct, at comparatively low cost and largely from readily obtainable standard automotive parts, a light but rugged and durable car especially suited for delivery purposes in crowded city streets.

What is claimed is:

1. A motor vehicle comprising a motorcycle power plant, frame and front wheel, the rear wheel of the motorcycle being removed, leaving the rear forks of the motorcycle equipped with the chain adjusting means for the rear sprocket, a rear axle assembly comprising a rear axle housing, differential and wheels, a frame carried by said rear axle housing, means for rigidly connecting the forward portion of said frame to the rearward portion of said motorcycle frame, a gear box shiftably positioned in the free space of the motorcycle rear forks and including a gear connected in driven relation to the power plant of said motorcycle, drive shafting from said gear to the differential housing, said drive shafting including telescopically related shaft sections and means operable by the chain adjusting mechanism of the motorcycle forks for effecting adjustment of the gear box described, independently of the connection between the two frames.

2. A motor vehicle, comprising a rear axle assembly, including an axle and differential housing and a spring mounted frame supported on said axle housing, said differential housing having a sleeve portion and a shaft casing telescopically related therewith, a motorcycle unit comprising the frame, front wheel and power plant of a motorcycle, the rearward portion of said motorcycle frame being rigidly connected with the forward portion of said rear axle frame, a sprocket chain driven gear unit adjustably mounted on the combined frames and operated from the power plant of the motorcycle and universally jointed telescopically adjustable shafting extending through said shaft casing from said gear unit whereby adjustment of the gearing can be effected independently of the connection between the two frames.

3. A motor vehicle, comprising a rear axle assembly having a body supporting frame, a motorcycle unit comprising a motorcycle frame, power plant and front wheel, said motorcycle frame having rear forks rigidly secured to the rear axle frame, said forks having sprocket adjusting means, gearing adjustably mounted on the combined frames, driven from the motorcycle power plant and adjustable by said sprocket adjusting means, and variable length shafting for driving said rear axle from the gearing, whereby adjustment of the gearing and shafting may be effected independently of the connection between the two frames.

4. A motor vehicle, comprising the combination of a rear axle assembly of axle housing, differential housing and spring supported frame on said axle housing, a motorcycle unit consisting of a motorcycle frame, front wheel, motor and gearset structure, the rear forks of the motorcycle frame being rigidly secured to an intermediate portion of the rear axle frame and the front portion of said rear axle frame being secured to the rear portion of the motor body, a shaft drive for the rear axle and chain drive connections from the gearset to said shaft drive including a gear box adjustably mounted within the rear portion of the motorcycle frame, said motorcycle frame carrying rear sprocket adjusting bolts operatively connected to adjust the chain drive aforesaid.

5. In combination with a motorcycle assembly having foot rests and a passage through the motorcycle structure for a bolt to support said foot rests, a rear axle assembly including wheels, axle housing, differential and a frame spring-mounted on said axle housing, a bolt connecting the forward portion of said frame through the opening in the motor structure provided for the foot rest supporting bolt and power transmission connections from the motor to the differential of the rear axle assembly.

6. In combination with a motorcycle assembly having foot rests and a passage through the motorcycle structure for a bolt to support said foot rests, a rear axle assembly including wheels, axle housing, differential and a frame spring-mounted on said axle housing, a bolt connecting the forward portion of said frame through the opening in the motor structure provided for the foot rest supporting bolt, power transmission connections from the motor to the differential of the rear axle assembly, spacer sleeves on said connecting bolt between the sides of the frame and the sides of the motor structure and hangers for the foot rests carried by said spacer sleeves.

7. In combination with a motorcycle assembly having foot rests and a passage through the motorcycle structure for a bolt to support said foot rests, a rear axle assembly including wheels, axle housing, differential and a frame spring-mounted on said axle housing, a bolt connecting the forward portion of said frame through the opening in the motor structure provided for the foot rest supporting bolt, power transmission connections from the motor to the differential of the rear axle assembly and an inclined stanchion extending from the upper rearward portion of the motorcycle frame downwardly and outwardly to the side of the rear axle frame rearwardly of the connecting bolt aforesaid.

8. In combination with a motorcycle assembly having foot rests and a passage through the motorcycle structure for a bolt to support said foot rests, a rear axle assembly including wheels, axle housing, differential and a frame spring-mounted on said axle housing, a bolt connecting the forward portion of said frame through the opening in the motor structure provided for the foot rest supporting bolt, power transmission connections from the motor to the differential of the rear axle assembly, an inclined stanchion extending from the upper rearward portion of the motorcycle frame downwardly and outwardly to the side of the rear axle frame rearwardly of the connecting bolt aforesaid and means securing the rear axle forks of the motorcycle frame to said rear frame rearwardly of said inclined stanchion.

9. In combination with a rear axle assembly of axle housing, differential housing, supporting wheels and frame supported on the axle housing, a motorcycle frame rigidly connected with said rear axle frame and gearing for driving the rear axle from the power plant of the motorcycle including a gear box equipped with means for operation from the motorcycle power plant, an articulated shaft housing extending from said gear box to the differential housing and including telescopically related housing sections and universally jointed telescopically connected shafting in said telescopic articulated shaft housing, means for mounting the gear box in adjustable relation in the combined frames, the motorcycle frame carrying rear sprocket adjusting means operative on the mounting means of the gear box to positively effect adjustment of the latter.

10. In combination, a rear axle assembly including an axle housing and a differential housing having a projecting sleeve portion, a gear box, articulated shaft housing sections extending from said gear box and one of said shaft housing sections having a telescopic engagement with said projecting sleeve portion of the differential housing, means for securing said telescopically related parts in adjusted relation, universally jointed shaft sections in said housing sections and including telescopically related drive shaft elements, and a sprocket gear carried by the gear box for operation by the sprocket chain of a motorcycle.

11. A motor vehicle comprising a motorcycle frame and front wheel, and a rear axle assembly including wheels, axle and housing, a frame secured thereto, means rigidly connecting the motorcycle frame to the forward portion of the rear axle frame, gear set carried by the motorcycle frame, a gear box adjustably mounted in the rear portion of the motorcycle frame, a sprocket chain drive from said gear set to the gear box, a telescopic shaft housing extending from the gear box to the differential housing and telescopic shafting in said housing, whereby the gearing and shafting are adjustable independently of the connection between the two frames.

12. A motor vehicle comprising a motorcycle power plant, frame and front wheel, the rear wheel of the motorcycle being removed, leaving the rear forks of the motorcycle equipped with the chain adjusting means for the rear sprocket, a rear axle assembly comprising a rear axle housing, differential and wheels, a frame sprung on said rear axle housing, means for rigidly connecting the forward portion of said frame to the rearward portion of said motorcycle frame, a gear box positioned in the free space of the motorcycle rear forks and including a gear connected in driven relation to the power plant of said motorcycle, drive shafting from said gear to the differential housing, said drive shafting including universally jointed, telescopically related shaft sections and means operable by the chain adjusting mechanism of the motorcycle forks for effecting adjustment of the gearing described, independently of the connection between the two frames.

13. A motor vehicle, comprising a combined motorcycle unit, including frame, front wheel and power plant, and rear axle assembly, including a frame having a cross bar, a chain driven gear operated from the motorcycle power plant, variable length shafting and shaft housing operatively connecting said chain driven gear with the rear axle, means to secure the rear portion of the motorcycle frame to said cross bar, means to secure the motorcycle frame to the rear axle frame at a point forward of said cross bar, whereby the two frames are rigidly connected, and means to adjustably mount said chain driven gear in the combined frames, whereby said gearing and shafting are adjustable independently of the frames.

14. A motor vehicle comprising a motorcycle frame, front wheel and power plant, a rear axle assembly including wheels, axle and differential housing, a frame sprung thereon, means rigidly connecting the motorcycle frame to the forward portion of the rear axle frame, a gear box adjustably mounted on the combined frames, a sprocket chain drive for driving gearing in the gear box from the power plant, and universally jointed, variable length shafting for driving the rear axle from gearing in the gear box, whereby adjustment of the gearing may be effected independently of the connection between the frames.

In testimony whereof I affix my signature.

HARRY ISON.